INVENTOR
ALEXANDER H. FREY, JR.
BY Edward S. Gershuny
AGENT

United States Patent Office 3,487,361

Patented Dec. 30, 1969

3,487,361

BURST ERROR CORRECTION SYSTEM

Alexander H. Frey, Jr., Gaithersburg, Md., assignor to International Business Machines Corporation, Armonk, N.Y., a corporation of New York Filed Dec. 15, 1966, Ser. No. 602,101
Int. Cl. G06f *11/00;* G08b *29/00;* H04b *1/00*
U.S. Cl. 340—146.1 3 Claims

ABSTRACT OF THE DISCLOSURE

A burst error correction system capable of correcting a very high percentage, but less than 100%, of burst errors of a given length. Encoding circuitry operates upon input data to generate error detection and correction bits which are then transmitted along with the data bits. The transmitted message is operated upon by the decoding circuitry to generate a check word to be used for error detection and correction. A portion of the check word comprising less than half of it is examined to determine whether or not a correctable burst of errors has occurred. A correctable burst will then be corrected.

This invention relates to detecting and correcting burst errors in transmitted messages. More particularly, the invention relates to an improved burst error detecting and correcting system wherein fewer redundancy bits are needed to correct longer bursts than in the prior art, and which is easier to implement than prior art systems.

In digital computers and in data transmission systems, binary code sequences are frequently employed. These binary code sequences take the form of trains of positive and negative electrical pulses representing zero and one data bits. In data transmission systems which are subject to noise, many different kinds of error correcting codes have been developed to provide a means for detecting and correcting these errors. The kinds of errors which the various codes are capable of detecting and correcting fall generally into either one of two classifications; random errors or burst errors. Much of the theory behind the use of random error correcting codes has been based upon the assumption that each bit in a message is affected independently by noise, and that therefore the probability of a given error pattern depends only on the number of errors. Thus, for example, a random error correcting code will correct any pattern of *b* or fewer errors in a block of *n* bits. Although this assumption may lead to an appropriate model for some transmission systems, there are many other systems in which errors occur predominantly in bursts. For example, telephone line disturbances, such as lightning, generally occur intermittently and last longer than the time for one bit. As a further example, magnetic tape defects are generally larger than the space required for a bit and such defects will affect several bits within a given area of tape. In such systems, errors can be expected to occur in bursts.

Various burst error correcting codes are presently known and used. In general, data bit sequences are encoded by dividing the data bits by a coding polynomial P(X) to obtain a remainder R(X). The remainder bits comprise the error detecting and correcting bits and are transmitted following the data bits, the total comprising a message M(X), *n* bits in length. The message may be preceded by a series of framing bits which mark the beginning of the message. At the receiver a framing signal obtained from the framing bits will clear the decoding circuits and sense the beginning of a message. The decoder then proceeds to divide the message by the coding polynomial P(X). The remainder resulting from this division will be zero if no errors occurred during the transmission.

However, if a correctable burst of errors did occur, then the remainder obtained from the burst error correcting code polynomial by the decoder will define an error pattern to be used to locate and correct the errors.

The size of the class of polynomials which can be used as coding polynomials in prior art burst error correction systems is limited by certain criteria. One criterion which identifies a burst correcting polynomial is that the sum of any two possible burst error patterns $E_1(X)+E_2(X)$ divided by the coding polynomial P(X) must yield a remainder R(X) that is not equal to zero. Thus, the coding polynomial will depend upon the length of the transmitted message block and upon the length of the longest burst which is to be correctable. One of the problems with prior art burst error correction systems is that there is no known way, other than trial and error, to find an efficient coding polynomial which can be used to detect and correct bursts of a given length. Many coding polynomials with burst error correction capabilities are known but their use generally results in adding a number of redundancy bits to the message that is larger by a factor of 3 or more than the maximum number of bits in a correctable burst. Using the prior art burst error correction system is therefore quite expensive in terms of message space.

It is therefore an object of this invention to enlarge the class of coding polynomials which can be used in a burst error correction system.

It is another object of this invention to provide a system wherein any polynomial of a given degree (value of the highest exponent of "X" in the polynomial) may be used as a coding polynomial.

It is another object of this invention to correct burst errors of a given length while using a coding polynomial of lower degree than was used by the prior art.

It is a more particular object to use polynominals with simple encoding and decoding implementation.

It is a further object of this invention to reduce the amount of circuitry needed in the error detection and correction apparatus.

The above and related objects are accomplished in accordance with one aspect of the invention by providing a burst error correction system which is capable of correcting a high percentage, but less than 100%, of burst errors of a given length. Encoding circuitry is provided which operates upon input data in a predetermined manner to generate error detecting and correcting redundancy bits. The redundancy bits are transmitted along with the data bits. The transmitted message which comprises data bits and redundancy bits, is received by the decoding circuitry which will operate upon the received bits to generate a syndrome or check word which is then used for error detection and correction. To examine the check word and determine whether or not a correctable burst of errors has occurred, decision logic circuitry is provided. The decision logic circuitry comprises a shift register with the outputs of a number of consecutive stages furnishing inputs to an AND gate. The presence of a correctable burst error will be signaled by all of said stages containing zeros. With this invention, fewer than half (generally about 10%) of the stages of the shift register are checked for the zero condition. This differs from the prior art which always had to feed at least half, and generally about ⅔ of the shift register stages to the AND gate. If a correctable burst is detected, it will be corrected by correction circuitry.

One advantage of the invention is that fewer redundancy bits are needed in order to be able to correct a burst error of a given length. Thus, each transmitted message will have a greater density of information bits than in the prior art.

This leads to the further advantage that information may be transmitted at a greater rate without increasing the bit frequency of the system. There is also an increase in the number of errors that can be corrected.

A further advantage of the invention is that many of the problems involved in finding a coding polynomial to be used in a burst error correction system have been obviated by the fact that any polynomial of the proper degree can be used. Also, a coding polynomial of lower degree can be used to correct burst errors of a given length. With this invention the selection of a coding polynomial becomes a simple procedure. For this reason, ease of implementation can be regarded as the major criterion for the selection of a coding polynomial. This will result in a simpler hardware configuration with fewer components that will still achieve results superior to that of the prior art at greater speed.

The foregoing and other objects, features and advantages of the invention will be apparent from the following more particular description of a preferred embodiment of the invention as illustrated in the accompanying drawings.

Figure 1:
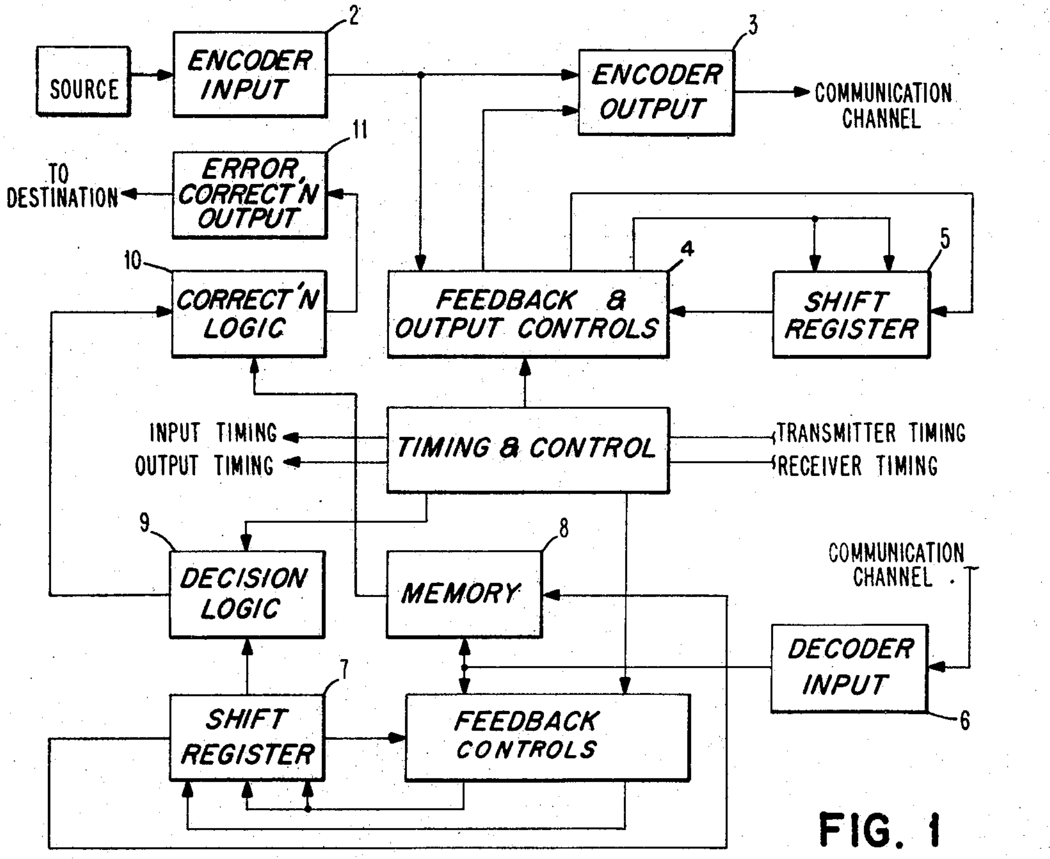
FIG. 1 shows a general block diagram of a burst error correction system.

In order to facilitate understanding of this invention, a brief review of prior art burst error correction techniques will precede the detailed description of the invention. For a more complete discussion of prior art burst error correction techniques, see for example W. W. Peterson "Error-Correcting Codes," the M.I.T. Press, 1961.

A series of data bits, binary zeros and ones, may represent a polynomial having X's raised to descending powers with coefficients of zero or one depending upon the digits of the data bits.

A sequence of K data bits $A_{K-1}, A_{K-2} \cdots A_1, A_0$ may then be associated with a polynomial D(X):

$$D(X)=A_{K-1}X^{K-1}+A_{K-2}X^{K-2}+\cdots+A_1X+A_0$$

P(X) represents a second sequence of bits of a suitably chosen coding polynomial with burst error correction capabilities. The degree of P(X) is denoted by $r$ and the coding polynomial chosen is one that can correct bursts of errors of lengths equal to or less than $b$ where $b$ is less than $r$. (In the prior art devices, $b$ is generally equal to or less than one-third $r$.)

The first step in most of the prior art coding schemes is to multiply D(X) by $X^r$ to obtain:

$$X^rD(X)=A_{K-1}X^{r+K-1}+A_{K-2}X^{r+K-2}+\cdots+A_1X^{r+1}+A_0X^r$$

The next step is to divide $X^rD(X)$ by the coding polynomial P(X). Addition and subtraction are carried out modulo two, which is represented by the symbol $\oplus$. The result of this division is a quotient Q(X) and a remainder R(X), the degree of R(X) being less than $r$, the degree of the coding polynomial, i.e.;

$$X^rD(X)/P(X)=Q(X)\oplus R(X)/P(X)$$

which can be rewritten as $$X^rD(X)=P(X)Q(X)\oplus R(X)$$

The transmitted message polynomial which includes the original data plus the burst error correcting bits, R(X), is represented as $$M(X)=X^rD(X)\oplus R(X)=P(X)Q(X)$$

(Note that addition and subtraction modulo two give the same result.)

The sequence of bits represented by M is transmitted, higher order bits first, to a receiver. The received bits are represented by M'. At the receiver, the polynomial M'(X) having coefficients corresponding to M' is divided by P(X). If no errors have occurred during transmission, the remainder of this division will be zero. If an error in transmission has produced a correctable burst (that is, all errors are concentrated within a block of $b$ bits) then there will be a concentration of 1's in the remainder within a block of $b$ bits. The 1's in the remainder will then represent the error pattern and they can be used to correct the errors. If the errors do not fall within a correctable burst, then the 1's in the remainder will not be concentrated within a block of length $b$; that is, there will be $b$ or more bit positions between the first and last 1 appearing in the remainder. An error of this type will not be corrected by the system.

THEORY OF THIS INVENTION

A characteristic of this invention is that it corrects a very large percentage (substantialy all) of the burst errors of the length for which it was designed.

The coding polynomial used in implementing this invention can be any arbitrary polynomial of degree $r$ greater than or equal to $b+\log_2(n+1)$, where $b$ is the length of burst to be corrected and $n$ is the length of a block of a transmitted message.

As in the prior art, the message is encoded by first multiplying the polynomial D(X) representing the incoming bits of information by $X^r$ and then dividing by the coding polynomial P(X) to obtain a message M(X)

$$M(X)=X^rD(X)\oplus R(X)=P(X)Q(X)$$

where Q(X) is the quotient obtained as a result of the division process.

At the receiver, the received message M' is multiplied by $X^a$ where $a=\alpha-(n-r)$ where $\alpha$ is the period of the coding polynomial P(X), and divided by the coding polynomial P(X). If the remainder of this division is equal to zero, then no errors have occurred in the transmission of the message. If the remainder is not equal to zero, then it will be used in the correction process.

If none of the errors have occurred outside the first $b$ bits that were transmitted, then the lowest order $r-b$ bit positions of the remainder will all be zero and the highest order $b$ bit positions of the remainder will contain the burst error pattern. If errors have occurred outside the first $b$ bits transmitted, but none have occurred outside the first $r$ bits transmitted, then some 1's will appear in the first $r-b$ but positions of the remainder. If errors have occurred outside the first $r$ bits transmitted, then there is some fixed probability E (dependent upon the coding polynomial and on the number of errors outside the first $r$ bits transmitted) that each single bit position of the remainder from position 1 through position through position $r-b$ will be zero. Assuming that the probability of error E, for each of the positions is independent, then the probability that all of the bit positions from one through $r-b$ will be zero simultaneously is approximately equal to $E^{r-b}$. Thus, if the condition of all zeros in the $r-b$ lowest order positions of the remainder is used to indicate a burst of errors in the first $b$ bits transmitted, with the pattern of 1's in the remainder representing the error pattern, then there is a probability of error $E^{r-b}$ which can be made arbitrarily small by making $r-b$ large.

If the condition for existence of a correctable burst is not met, then the remainder bits can be shifted in a shift register and the same condition checked to determine if a correctable burst of errors has occurred in bits 2 through $b+1$ of the transmitted block. Each succeeding shift of the register will shift the span of bits over which the burst is detected by one bit position. The shifting operation can be done $n-b$ times. The probability of falsely detecting, at some shift through the block, the condition which indicates a burst of length less than or equal to $b$ bits is then approximately $(n-b)\ E^{r-b}$. For large values of $b$, this probability will be very small. Thus, the technique can be expected to be extremely efficient and effective for long-burst error correction.

SYSTEM CONFIGURATION

A block diagram showing the major components of a burst error correction system incorporating the invention is shown in FIGURE 1. The system shown can both encode a message for transmission and receive an encoded message. Data is received from a source at the encoder input 2. The data is sent to the encoder output 3 to be transmitted via a communication channel and the data is also sent to the feedback and output control 4. Remainder bits to be used for error detection and correction are calculated in the feedback shift register 5. During the encoding process, the feedback to the shift register 5 is controlled by the data sent to the feedback and output controls 4 from the encoder input 2. After the remainder bits have been calculated, they are sent to the encoder output 3 to be transmitted via the communication channel. As mentioned above, this system can both transmit and receive messages. When the system is operating as a receiver, data bits and redundancy bits are received at the decoder input 6 from another encoder (not shown). The data and redundancy bits are used in the feedback shift register 7 to calculate the check word (syndrome) corresponding to the received data and redundancy. Each redundancy bit is discarded after its contribution to the check word as been made. Thus, there is no need to store any of the redundancy in the decoding process. The incoming data word will be stored in the memory 8 and the calculated check word will be stored in the shift register 7. After it has been calculated, the check word may then be placed in another shift register within the decision logic 9 so that the shift register 7 may be used to calculate the check word for the next incoming message.

When calculation of the check word is completed and the check word has been stored in the shift register of the decision logic 9, the pattern in the check word is examined by the decision logic. The decision logic determines whether a correctable burst has occurred. If, according to the previously described procedures, it is determined that a correctable burst has occurred, the correction logic 10 will be set to correct it. The appropriate correction is made as the data is passed to the decoder output 11.

As the data is passed out of the memory 8 through the correction logic 10 to the decoder output 11, it is replaced in the memory by new data from the decoder input 6. As in prior art systems, timing for data to the decoder input is received via the communication channel. The various ways in which timing control may be accomplished are well known to those skilled in the art and need not be discussed here.

DETAILED DESCRIPTION

The previous sections describe the burst error correction technique used in this invention and an equipment configuration used to implement the technique. The following sections will present, as an example, the implementation of a specific coding polynomial and will describe in detail the shift registers used by the encoder and by the decoder, the feedback and output controls, the decision logic, and the correction logic.

SELECTION OF A CODING POLYNOMIAL

For the purpose of this example, we will assume that data will be entering the system in blocks that are 100 bits in length. If we use a half-rate code (i.e., a code in which there are equal amounts of information and redundancy), then we must use a hundredth degree polynomial for the coding polynomial. Since $r$ must be equal to or greater than $b+\log_2(n+1)$ where $r$ is the degree of the coding polynomial, $b$ is the maximum length of a correctable burst and $n$ is the length of a message block, then the system to be described in the following example will be capable of detecting and correcting bursts of errors that take up ninety-two or fewer bit positions. In the following examples, it will be assumed that burst errors with a maximum length of ninety bits are to be corrected. Although the system would produce more accurate results if it were used to correct shorter burst errors (e.g., 85 bits), this example is valid for illustrative purposes. The hundredth degree polynomial $$P(X)=X^{100}+X^{90}+X^{74}+X^{57}+X^{39}+X^{20}+1$$

has been selected as the coding polynomial to be used in the following examples.

ENCODING A MESSAGE

Figure 2:
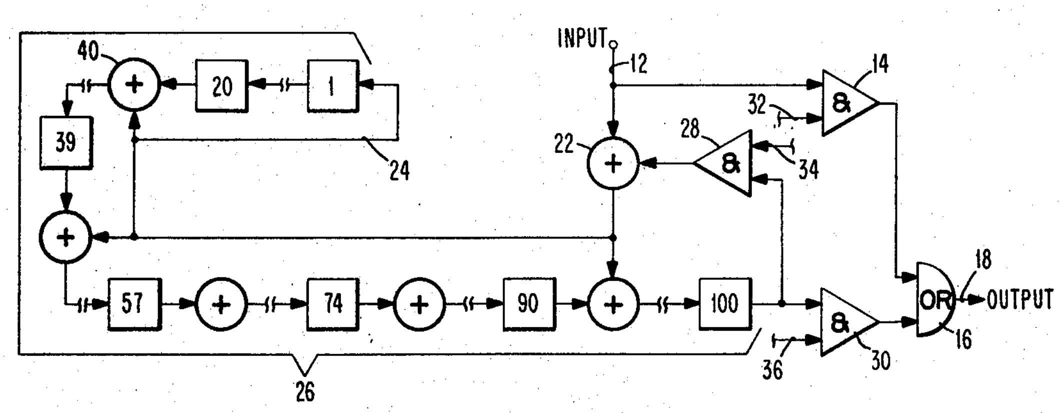
FIG. 2 shows an example of a polynomial encoder for encoding messages using a hundredth degree coding polynomial.

Referring to FIGURE 2, there is shown an encoder which may be used to multiply an incoming message D(X) by $X^{100}$ while simultaneously dividing by the coding polynomial $P(X)=X^{100}+X^{90}+X^{74}+X^{57}+X^{39}+X^{20}+1$. For simplicity, many of the details concerning the clocking information, shift lines, etc. have been omitted from the drawing. This conforms to acceptable practice in the art. It will be recognized that other devices which could perform the above function of multiplication and division (in parallel or in serial) could equally well be used. For further examples of prior art encoders, see W. W. Peterson, "Error-Correcting Codes," the M.I.T. Press, 1961. The input line 12 is connetced to one input of a two-input AND circuit 14 the output of which is connected to one input of an OR circuit 16 the output of which is connected directly to an output line 18. The input line 12 is also connected to one of the inputs of modulo-two adder 22. (The modulo-two adder may be simply an Exclusive-OR circuit.) The output 24 of modulo-two adder 22 provides inputs to a shift register 26 the stages of which are identified by the numerals 1 through 100. Only the first, twentieth, thirty-ninth, fifty-seventh, seventy-fourth, ninetieth and hundredth stages of the shift register 26 are shown in the drawing. The lower numbers correspond to the lower order stages of the shift register, and shifting is accomplished from left to right. The output of the last stage 100 of the shift register is fed to AND circuits 28 and 30. The output of AND circuit 28 feeds the second input of modulo-two adder 22. The output of AND circuit 30 feeds a second input of OR circuit 16. Since the last stage of the shift register 26 is fed back via modulo-two adder 22 to be added to other stages of the shift register, this arrangement is commonly called a "linear feed-back shift register."

During encoding of message bits in the apparatus shown, the shift register 26 is first cleared of all information by a clocking pulse (not shown). Initially, AND circuit 14 is energized by a timing signal on line 32 to allow the data input on line 12 to pass directly through the AND circuit 14, through the OR circuit 16 and to the output line 18. AND circuit 28 is initially energized by a signal on gate line 34, while AND circuit 30 is initially de-energized by gate line 36. Thus, the output of the last stage 100 of the shift register 26 is fed back through AND circuit 28 via line 38 to the modulo-two adder 22 where it is added, modulo-two, to the input data from line 12. The data input thus appears one hundred shifts ahead of stage 1 of the shift register. This is equivalent to a multiplication of the input by $X^{100}$. The feedback lines emanating from line 24 insert feedback information into the shift register to complement such shifted positions as correspond to the coding polynomial. For example, modulo-two adder 40 complements the output of position 20 of the shift register corresponding to the term $X^{20}$ of P(X). This accomplishes a division of the input data by the coding polynomial whereby only the remainder bits R(X) remain in the shift register after all data bits have arrived at the input 12.

After all of the information bits have been received, lines 32 and 34 are de-energized thereby blocking data from passing through the output line and also blocking the feedback from the shift register output stage 100. At the same time, line 36 is energized to permit the contents of the shift register to be shifted out through AND circuit 30 and OR circuit 16 to the output line. Thus, following the data bits, the remainder of the division by the coding polynomial is shifted out and appended to the end of the message.

DECODING A MESSAGE

In the decoding circuitry, the received message is examined and a syndrome (check word) is constructed from it. The syndrome will then be used in the error correction process.

A decoder which will compute a check word is constructed in accordance with this invention as follows: let P(X) denote the coding polynomial, and let $r$ and $n$ denote the degree of P(X) and the block length of the transmitted messages, respectively. Compute the coefficients $b_i$ such that $$\sum_{i=0}^{r-1} b_i x^{n-r+i} = 1$$

modulo P(X). Let $a_i$ denote the coefficients of $X^i$ in P(X). Construct an $r$-bit feedback shift register with the stages numbered from 1 through $r$ and shifting from low to high numbered stages. Place an Exclusive-OR circuit (modulo-two adder) between stages $i$ and $i+1$ whenever $a_i$ or $b_i$ is 1, where the $i^{th}$ stage provides one input to the Exclusive-OR circuit and feedback as defined below provides the other input. The output is shifted from stage $i$ to stage $i+1$.

In those cases where $a_i=1$ and $b_i=0$, feedback to the Exclusive-OR circuit between stages $i$ and $i+1$ comes from the $r^{th}$ stage. In those cases where $a_i=0$ and $b_i=1$, feedback comes from the input message bit. In those cases where $a_i=1$ and $b_i=1$, feedback comes from the output of an Exclusive-OR circuit, one input of which is connected to the output of the $r^{th}$ stage and the other input of which is the input message bit. The register is shifted with feedback for each input message bit in an encoded block. After $n$ shifts, all of the input bits have been entered into the register, and the register contains the check word corresponding to the received message block.

For the case of the coding polynomial $$P(X) = X^{100} + X^{90} + X^{74} + X^{57} + X^{39} + X^{20} + 1$$

$a_i=1$ for $i=0$, 20, 39, 57, 74, 90, 100 and $a_i=0$ for all other values of $i$. Since the last shift stage is stage 100 and has input corresponding to $a_{99}$ then $a_{100}$ need not be considered in constructing the shift register. For the exemplary coding polynomial given above, simple algebraic manipulation (remembering) that all addition and subtraction is carried out modulo-two) will produce the values of $b_i$. When using the polynomial of this example, $b_i=1$ for $i=0$, 4, 5, 10, 13, 15, 16, 17, 19, 22, 24, 25, 32, 36, 42, 43, 44, 46, 49, 51, 54, 58, 59, 62, 66, 67, 69, 70, 73, 76, 78, 80, 85, 86, 88, 89, 95, 96, 97, 99 and $b_i=0$ for all other values of $i$.

Figure 3:
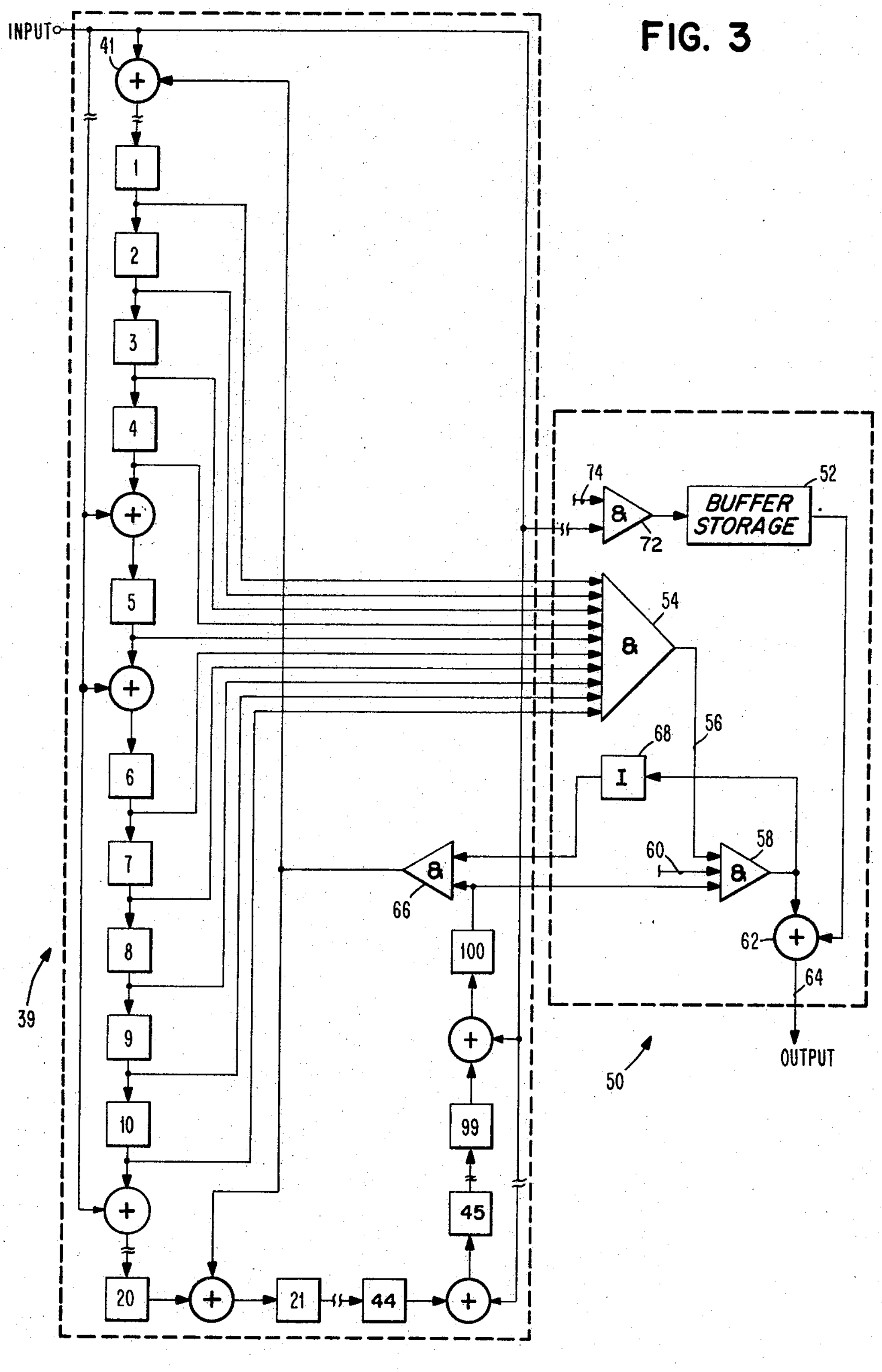
FIG. 3 shows a decoder and correction logic embodying this invention to be used with the encoder of FIG. 2.

Referring to FIGURE 3, a decoder 39 is shown which comprises a shift register constructed in accordance with the above parameters. The shift register contains one hundred stages denoted by the numerals 1 through 100 where the higher numerals corresponds to the higher order stages of the shift register. In FIGURE 3, only seventeen stages (i.e., 1–11, 20, 21, 42, 43, 99, 100) of the shift register are shown. Shifting is accomplished from low order stage to high order stage. From the values of $a_i$ and $b_i$ given above, the locations of the various Exclusive-OR circuits has been determined. Considering only the shift register stages shown in the drawing; an Exclusive-OR circuit has been placed following stages 4, 5, 10, 44, 99 because $b_4$, $b_5$, $b_{44}$, $b_{99}$ are all equal to one; there is an Exclusive-OR circuit following stage 20 because $a_{20}=1$; an Exclusive-OR circuit is needed after stage 100 (preceding stage 1) because both $a_0$ and $b_0$ are equal to one. There is no Exclusive-OR circuit immediately following stages 1, 2, 3, 6, 7, 8, 9, 21, 45, because neither $a_i$ nor $b_i$ was equal to one for any of those values of $i$. Because $a_i=0$ and $b_i=1$ for $i=4$, 5, 10, 44, 99 the second input to the Exclusive-OR circuit which follows stages 4, 5, 10, 44, 99 comes directly from the incoming message bit. Because $a_{20}=1$ and $b_{20}=0$, the Exclusive-OR circuit following the twentieth stage of the shift register receives its second input from the output of the hundredth ($r^{th}$) stage of the shift register. Because $a_0=1$ and $b_0=1$, the input to the first stage of the shift register comes from the output of Exclusive-OR circuit 41 the inputs of which are connected to the output of stage 100 of the shift register and to the incoming message bits. (If, for example, a coding polynomial P(X) were selected such that $a_0=1$ and $b_0=0$, then the input to the first stage of the shift register would come directly from the output of stage 100 of the shift register.)

If a message that has been encoded by the encoder shown in FIGURE 2 is received by the decoder 39 shown in FIGURE 3, a check word will be generated as the message is received. If the message is received without any transmission errors, then the calculated check word will contain all zeros. If any detectable errors have occurred during transmission, then the check word will contain one or more "1's."

CORRECTION LOGIC

As was described above, the condition of all 0's in the $r$-$b$ lowest order position of the check word (where $r$ is the number of stages in the shift register and $b$ is the length of a correctable burst) is used to indicate a burst of errors in the first $b$ bits transmitted, with the pattern of 1's in the remainder of the check word representing the error pattern. If the condition for the existence of a correctable burst is not met, then the check word will be shifted through the shift register with appropriate feedback and the same condition checked to determine if a correctable burst of errors has occurred in bits 2 through $b+1$ of the transmitted message block. Each succeeding shift of the register will shift the span of bits over which the burst is detected by one bit position. The shifting operation can be done $n$-$b$ times where $n$ is the total length of a message block. In the example being considered here, $r=100$, $b=90$, and $n=200$ (100 data bits plus 100 redundancy bits).

Still referring to FIGURE 3, the correction logic 50 is shown. During the time that the incoming message is being used in the decoder 39 to calculate a check word, the message is also being stored in a buffer storage unit 52. The buffer storage unit may be a shift register, delay line, core memory, magnetic tape or other suitable storage medium. After the last bit of the message has come into the system, the check word will be contained in stage 1 through 100 of the shift register in the decoder 39 and the received message will be contained in the buffer storage unit 52.

If a correctable burst of errors has occurred in the first ninety bits transmitted, then stages 1 through 10 of the shift register will all contain 0's and stages 11 through 100 (the highest order $b$ stages) of the shift register will contain the error pattern. In order to determine whether sages 1 through 10 of the shift register all contain 0's, the AND circuit 54 is provided. AND circuit 54 has ten inputs, each of the inputs being connected to the output of one of the stages 1 through 10 of the shift register. When all of the stages 1 through 10 of the shift register contain 0's, a signal will appear on the output line 56 of the AND circuit 54. The output 56 of the AND circuit 54 feeds one input of a three-input AND circuit 58. Another input of AND circuit 58 is fed by the output of stage 100 (the last stage) of the shift register contained in the decoder 39. The third input of AND circuit 58 is connected to gate line 60. The output of AND circuit 58 is connected to one input of Exclusive-OR circuit 62. The other input to Exclusive-OR circuit 62 is connected to the output of the buffer storage unit, 52. The output of Exclusive-OR circuit 62 is connected directly to the output line 64 of the system.

If any of the stages 1 through 10 of the shift register does not contain a 0, this will indicate that one or more errors have occurred outside of the first ninety bits transmitted. In order to determine whether a correctable burst of errors has occurred, and in order to locate the burst, the contents of the shift register will be shifted with feedback and the first ten stages will again be checked to see if they all contain 0's. This shifting will be repeated until the first ten stages all contain 0's (indicating that a correctable burst of errors has been located) or until *n-b* shifts have taken place without all of the first ten stages containing 0's (indicating that a non-correctable error has been detected) where *n* is the total length of a message block and *b* is the maximum length of a correctable burst.

Once a burst has been located, it will become necessary to shift the contents of the shift register of the decoder 39 without feedback. In order to accomplish this, an AND circuit 66 may be provided within the decoder 39 following the last stage 100 of the shift register. One input of the AND circuit 66 is fed by the output of stage 100 of the shift register. The other input of AND circuit 66 is connected to the output of an inverter circuit 68 the input of which is connected to the output of AND circuit 58.

During the computation of the check word, there will be no signal present on gate line 60 and therefore there will be no output from AND circuit 58. During this time, there will be an output from inverter circuit 68 to enable AND circuit 66 to permit proper feedback to be supplied to the shift register in the decoder 39. After the check word has been computed, a signal will appear on gate line 60. Then, if 0's appear in all of the stages 1 through 10 of the shift register (indicating that a correctable burst has been located) there will be an output from AND circuit 58 whenever a 1 appears in the hundredth stage of the shift register. This output will cause the inverter circuit 68 to disable the AND circuit 66 and prevent feedback within the shift register. It will be understood by those skilled in the art that this arrangement is merely one example of many that could be used to block feedback to the shift register when a correctable error has been located.

The decoder 39 and correction logic 50 shown in FIGURE 3 detects and corrects errors by performing the following steps:

(1) The entire received message is read into the buffer storage unit 52 and simultaneously into the shift register of the decoder 39. The shift register of the decoder 39 is shifted with the feedback each time that a bit enters the system. There is no feedback in the buffer storage unit 52. During this time, there is no signal on gate line 60.

(2) The received message is then read out of the buffer storage unit 52 one bit at a time, and the shift register in the decoder 39 is shifted with feedback once for each bit, with no input. During this step (and during the next step) a signal is present on gate line 60.

(3) As soon as all 0's appear in the first ten stages of the shift register, the error pattern will be contained in the last ninety high order stages of the shift register, and the erroneous bits will be about to come out of the buffer storage unit 52. Since there are signals appearing on lines 56 and 60, there will be a signal output from AND circuit 58 each time that a 1 appears on the hundredth stage of the shift register. Thus, the Exclusive-OR circuit 62 will cause erroneous bits coming from the buffer storage unit 52 to be complemented before they are transmitted to the output line 64.

Although the system described is capable of correcting errors that occur in the error detection and correction (redundancy) bits, it will generally be necessary to correct only errors occurring in the data bits. However, it is necessary to perform a sufficient number of shifts within the shift register to determine that whatever error occurred was indeed correctable.

Although, in the description given above, the buffer storage unit 52 was assumed to have sufficient capacity to hold the entire transmitted message, it is not necessary that it do this. If correction of data bits is all that is desired, then the buffer storage unit need only be large enough to hold all of the data bits transmitted. In the case of the example presently under consideration, a buffer storage unit with a one hundred bit capacity would be sufficient to hold all of the transmitted data bits. In a system wherein the error detection and correction bits are not stored in the buffer storage unit, it would be necessary to disconnect the input of the buffer storage unit from the input to the system. One way of accomplishing this would be to insert an AND circuit 72 between the input to the buffer storage unit and the input to the system. The gate line 74, during the time that data bits are entering the system, would permit the bits to be stored in the buffer storage unit. During the time when error detecting and correcting bits are entering the system, no signal would appear on line 74 and AND circuit 72 would therefore block the error detecting and correcting bits from entering the buffer storage unit 52.

As was described above under the heading "System Configuration," the correction logic 50 could have within it an additional shift register (not shown) which would accept the check word from the decoder 39 so that the decoder could immediately begin to decode the next message. Such a shift register within the correction logic would be identical to that shown in the decoder 39 except that the feedback path emanating from the decoder input could be eliminated. This is because there is no input while the check word is being examined.

The above-described embodiment of this invention dramatically illustrates some of the advantages of this invention over the prior art.

First of all, using this invention, the addition of only one hundred bits of redundancy are sufficient to correct burst errors that are up to ninety bits in length. This represents a great improvement over the prior art, which would require *at least* one-hundred-eighty bits of redundancy in order to be able to correct ninety-bit bursts. For example, implementation of a fire code to correct bursts up to ninety bits in length would require on the order of two-hundred-seventy bits of redundancy. (See W. W. Peterson, "Error Correcting Codes," the M.I.T. Press, 1961, for a description of fire codes.)

Another significant advantage of this invention results from its novel feature of being able to use any polynomial of the proper length (or degree) for the coding polynomial. This permits the selection of a polynomial that will result in a very simple circuit implementation. For example, if a polynomial is selected that requires only a small amount of feedback within the shift register used in the system, then many stages of the shift register can be eliminated and simply replaced by a delay line. For this reason, this invention can be implemented using micro-miniature circuitry far more easily than the prior art.

Still another advantage of this invention is that the AND circuit 54 which examines the first *r-b* stages of the shift register is much smaller (has far fewer inputs) than those used in the prior art. In the example given above, a ten-input AND circuit was sufficient to detect and localize a burst of errors up to ninety bits in length whereas the prior art would typically have required a one-hundred-eighty-input AND circuit to detect and localize a ninety-bit burst.

Thus, a system incorporating this invention will be simpler in implementation than the prior art while still being able to correct longer bursts of errors in less time than the prior art.

FURTHER EXAMPLES OF OPERATION

So as not to overburden this specification, numerical examples showing precisely how messages are handled by the system were not given for the embodiment of the invention described above. However, in order to further facilitate a complete understanding of this invention, all of the operational details, along with specific examples, of a smaller burst error correction system illustrating the operation of this invention will now be described. It will be recognized that the embodiment described above (as well as embodiments that are even larger) will work in precisecly the same manner as the example to be described below. Although this example does not illustrate the practical advantages of the invention, it will serve to illustrate the operational characteristics of the invention.

For the purpose of the following simple examples, it will be assumed that data will be entering the system in blocks eight bits in length. Since a half-rate code will also be assumed, then an eighth degree polynomial will be needed for the coding polynomial. The coding polynomial $P(X)=X^8+X^6+X^4+X^2+X+1$ has been selected for use in the following examples. Since $r$ must be equal to or greater than $b+\log_2(n+1)$ where $r$ is the degree of the coding polynomial, $b$ is the maximum length of a correctable burst and $n$ is the length of a message block, then the system now to be described will be capable of detecting and correcting bursts of errors that take up three or fewer bit positions.

ENCODING A MESSAGE

Figure 4:
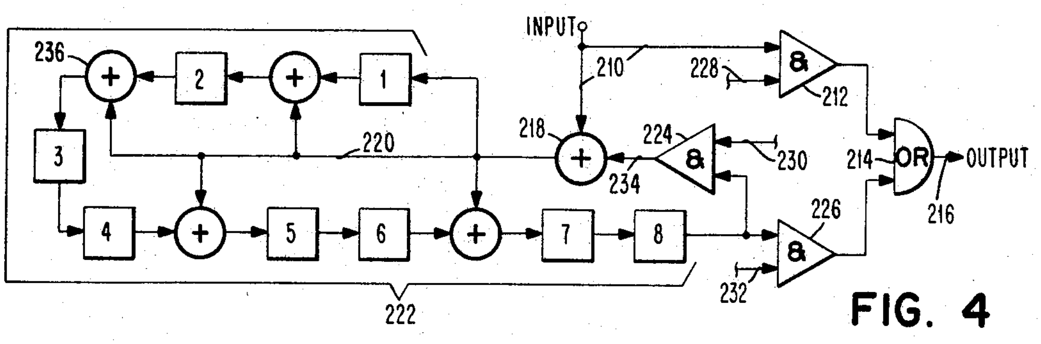
FIG. 4 shows a polynomial encoder which utilizes an eighth degree coding polynomial.

Referring to FIG. 4, there is shown a device which may be used to multiply an incoming message D(X) by $X^8$ while simultaneously dividing by the coding polynomial $P(X)=X^8+X^6+X^4+X^2+X+1$. For simplicity, many of the details concerning the clocking information, shift lines, etc. have been omitted from the drawing. This conforms to acceptable practice in the art. The input line 210 is connected to one input of a two-input AND circuit 212 the output of which is connected to one input of an OR circuit 214 the output of which is connected directly to an output line 216. The input line 210 is also connected to one of the inputs of modulo-two adder 218. The output 220 of modulo-two adder 218 provides inputs to a shift register 222 the stages of which are identified by the numerals 1 through 8. The lower numbers correspond to the lower order stages of the shift register, and shifting is accomplished from left to right. The output of the last stage 8 of the shift register is fed to AND circuits 224 and 226. The output of AND circuit 224 feeds the second input of modulo-two adder 218. The output of AND circuit 226 feeds a second input of OR circuit 214.

During encoding of message bits, in the apparatus shown, the shift register 222 is first cleared of all information by a clocking pulse (not shown). Initially AND circuit 212 is energized by a timing signal on line 228 to allow the data input on line 210 to pass directly through the AND circuit 212, through the OR circuit 214 and to the output line 216. AND circuit 224 is initially energized by a signal on gate line 230, while AND circuit 226 is initially de-energized by gate line 232. Thus, the output of the last stage 8 of the shift register 222 is fed back through AND circuit 224 via line 234 to the modulo two adder 218 where it is added, modulo two, to the input data from line 210. Thus, the data input appears eight shifts ahead of stage 1 of the shift register. This is equivalent to a multiplication of the input by $X^8$. The feedback lines emanating from line 220 insert feedback information into the shift register to complement such shifted positions as correspond to the coding polynomial. For example, modulo-two adder 236 complements the output of position 2 of the shift register corresponding to the term $X^2$ of P(X). This accomplishes a division of the input data by the coding polynomial whereby only the remainder bits R(X) remain in the shift register after all data bits have arrived at the input 210.

After all the information bits have been received, lines 228 and 230 are de-energized thereby blocking data from passing to the output line and also blocking the feedback from the shift register output stage 8. At the same time, line 232 is energized to permit the contents of the shift register to be shifted out through AND circuit 226 and OR circuit 214 to the output line. Thus, following the data bits, the remainder of the division by the coding polynomial is shifted out and appended to the end of the message. The following table illustrates the contents of the shift register during the encoding of a sample data bit sequence 10001001.

| Input | 1 | 2 | 3 | 4 | 5 | 6 | 7 | 8 |
|---|---|---|---|---|---|---|---|---|
| Reset | 0 | 0 | 0 | 0 | 0 | 0 | 0 | 0 |
| 1 | 1 | 1 | 1 | 0 | 1 | 0 | 1 | 0 |
| 0 | 0 | 1 | 1 | 1 | 0 | 1 | 0 | 1 |
| 0 | 1 | 1 | 0 | 1 | 0 | 0 | 0 | 0 |
| 0 | 0 | 1 | 1 | 0 | 1 | 0 | 0 | 0 |
| 1 | 1 | 1 | 0 | 1 | 1 | 1 | 1 | 0 |
| 0 | 0 | 1 | 1 | 0 | 1 | 1 | 1 | 1 |
| 0 | 1 | 1 | 0 | 1 | 1 | 1 | 0 | 1 |
| 1 | 0 | 1 | 1 | 0 | 1 | 1 | 1 | 0 |

The remainder is $0X^7+1X^6+1X^5+1X^4+0X^3+1X^2+1X+0$. When the remainder bits are appended to the end of the data bits 10001001, the transmitted message becomes 1000100101110110. The higher order bits are transmitted first.

DECODING THE MESSAGE

In the decoding process, the received message is examined and a syndrome (check word) is constructed from it. The syndrome will then be used in the error correction process.

As has been previously described, a decoder which will compute a check word is constructed in accordance with this invention as follows: let P(X) denote the coding polynomial, and let $r$ and $n$ denote the degree of P(X) and the block length of the transmitted messages, respectively. Compute the coefficients $b_i$ such that $$\sum_{i=0}^{r-1} b_i X^{n-r+i}=1$$

modulo P(X). Let $a_i$ denote the coefficient of $X^i$ in P(X). Construct an $r$-bit feedback shift register with the stages numbered from 1 through $r$ and shifting from low to high numbered stages. Place an Exclusive-OR circuit (modulo-two adder) between stages $i$ and $i+1$ whenever $a_i$ or $b_i$ is 1, where the $i^{th}$ stage provides one input to the Exclusive-OR circuit and feedback as defined below provides the other input. The output is shifted from stage $i$ to stage $i+1$.

In those cases where $a_i=1$ and $b_i=0$, feedback to the Exclusive-OR circuit between stages $i$ and $i+1$ comes from the output of the $r^{th}$ stage. In those cases where $a_i=0$ and $b_i=1$, feedback comes from the input message bit. In those cases where $a_i=1$ and $b_i=1$, feedback comes from the output of an Exclusive-OR circuit, one input of which is connected to the output of the $r^{th}$ stage and other input of which is the input message bit. The register is shifted with feedback for each input message bit in an encoded block. After $n$ shifts, all of the input bits have been entered into the register, and the register contains the check word corresponding to the received message block.

In the case of the coding polynomial $$P(X)=X^8+X^6+X^4+X^2+X+1$$

the values of $a_i$ are $a_0=1$, $a_1=1$, $a_2=1$, $a_3=0$, $a_4=1$, $a_5=0$, $a_6=1$ and $a_7=0$. As before $a_r$ (corresponding in this example to $a_8$) need not be considered in constructing the shift register. For the exemplary coding polynomial given above, simple algebraic manipulation will produce the values of $b_i$. It must be remembered that all addition and subtraction is carried out modulo two. When $$P(X)=X^8+X^6+X^4+X^2+X+1$$

then $b_0=1$, $b_1=1$, $b_2=1$, $b_3=0$, $b_4=1$, $b_5=1$, $b_6=1$ and $b_7=1$.

Figure 5:
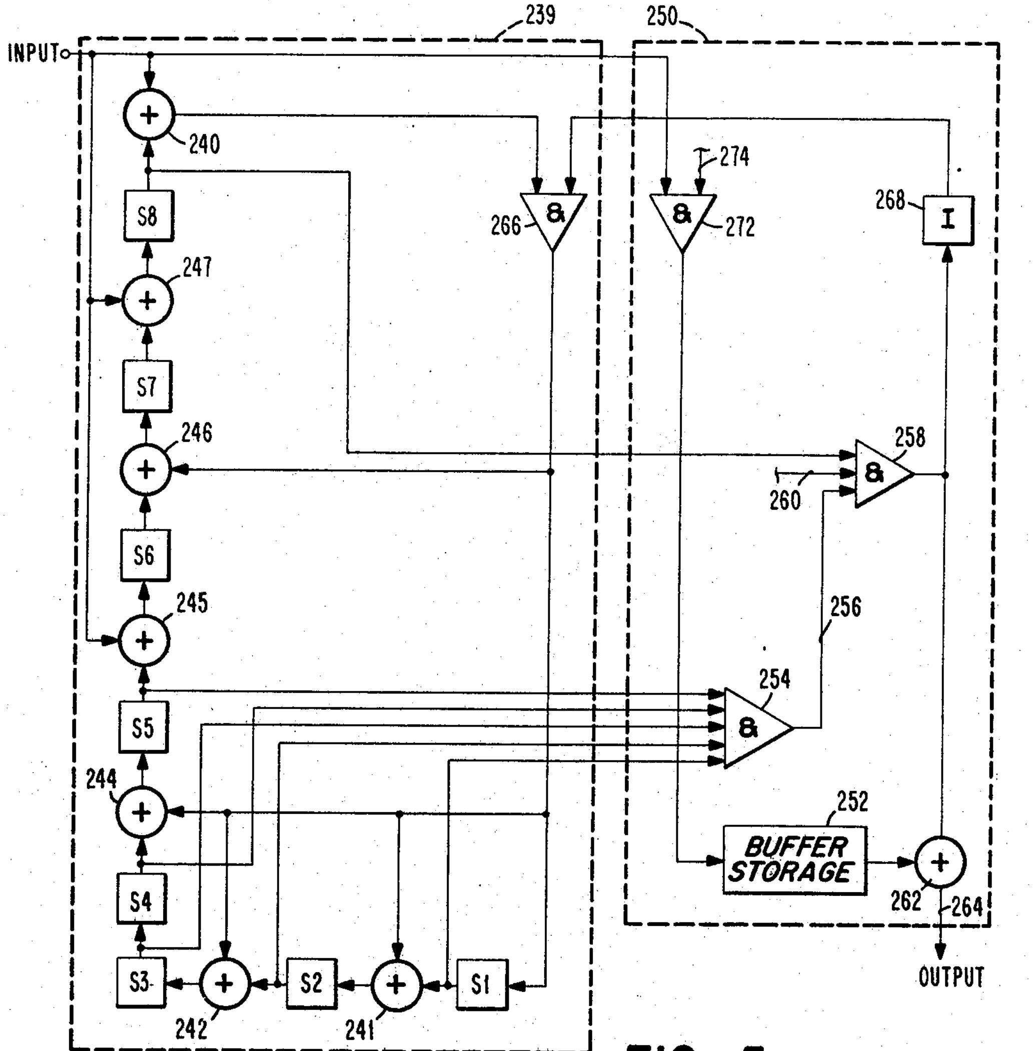
FIG. 5 shows a decoder and correction logic embodying the invention to be used with the encoder of FIG. 4.

Referring to FIGURE 5, a deocoder 239 is shown which comprises a shift register constructed in accordance with the above parameters. The shift register contains eight stages denoted by S1 through S8 where the higher numerals correspond to the higher order stages of the shift register. Shifting is accomplished from low order stage to high order stage. From the values of $a_i$ and $b_i$ given above, it can be seen that an Exclusive-OR circuit must be inserted between each two adjacent stages of the shift register except between the third and fourth stages. (There is no Exclusive-OR circuit between the third and fourth stages because $a_3=0$ and $b_3=0$.) Because $a_0=1$ and $b_0=1$, the input to stage S1 of the shift register comes from the output of Exclusive-OR circuit 240 the inputs of which are connected to the output of stage S8 of the shift register and to the incoming message bit. (If, for example, a coding polynomial P(X) were selected such that $a_0=1$ and $b_0=0$, then the input to the first stage of the shift register would come directly from the output of stage S8 of the shift register.) Since $a_i=1$ and $b_i=1$ for $i=1$, 2, 4 and 6, the second input to the Exclusive-OR circuits which follow stages S1, S2, S4 and S6 of the shift register is the modulo two sum of the output of the eighth stage of the shift register and the incoming message bits. Since $a_i=0$ and $b_i=1$ for $i=5$ and 7, the second input to the Exclusive-OR circuit which follows the fifth and seventh stages of the shift register comes directly from the incoming message bit. For the example given, there is no value of $i$ for which $a_i=1$ and $b_i=0$. If there were some value of $i$ for which $a_i=1$ and $b_i=0$, then the Excusive-OR circuit following the $i^{th}$ stage of the shift register would receive its second input from the output of the eighth ($r^{th}$) stage of the shift register.

When the encoder of FIG. 4 was described above, it was shown that a block of data bits 10001001 would be encoded as the message 1000100101110110. If that message is received without any transmission errors by the encoder of FIG. 5, then the calculated check word should contain all zeros. The following table shows the contents of each stage of the shift register during the computation of the check word for the message

1000100101110110

| Input | 1 | 2 | 3 | 4 | 5 | 6 | 7 | 8 |
|---|---|---|---|---|---|---|---|---|
| Reset | 0 | 0 | 0 | 0 | 0 | 0 | 0 | 0 |
| 1 | 1 | 1 | 1 | 0 | 1 | 1 | 1 | 1 |
| 0 | 1 | 0 | 0 | 1 | 1 | 1 | 0 | 1 |
| 0 | 1 | 0 | 1 | 0 | 0 | 1 | 0 | 0 |
| 0 | 0 | 1 | 0 | 1 | 0 | 0 | 1 | 0 |
| 1 | 1 | 1 | 0 | 0 | 0 | 1 | 1 | 0 |
| 0 | 0 | 1 | 1 | 0 | 0 | 0 | 1 | 1 |
| 0 | 1 | 1 | 0 | 1 | 1 | 0 | 1 | 1 |
| 1 | 0 | 1 | 1 | 0 | 1 | 0 | 0 | 0 |
| 0 | 0 | 0 | 1 | 1 | 0 | 1 | 0 | 0 |
| 1 | 1 | 1 | 1 | 1 | 0 | 1 | 0 | 1 |
| 1 | 0 | 1 | 1 | 1 | 1 | 1 | 1 | 1 |
| 1 | 0 | 0 | 1 | 1 | 1 | 0 | 1 | 0 |
| 0 | 0 | 0 | 0 | 1 | 1 | 1 | 0 | 1 |
| 1 | 0 | 0 | 0 | 0 | 1 | 0 | 1 | 1 |
| 1 | 0 | 0 | 0 | 0 | 0 | 0 | 0 | 0 |
| 0 | 0 | 0 | 0 | 0 | 0 | 0 | 0 | 0 |

Thus, the decoder will correctly compute a check word containing all zeros when the message is received without any errors.

CORRECTION LOGIC

As was described above, the condition of all 0's in the $r$-$b$ (where $r$ is the number of stages in the shift register and $b$ is the length of a correctable burst) lowest order positions of the remainder is used to indicate a burst of errors in the first $b$ bits transmitted, with the pattern of 1's in the remainder representing the error pattern. If the condition for the existence of a correctable burst is not met, then the remainder bits can be shifted one position and the same condition checked to determine if a correctable burst of errors has occurred in bits 2 through $b+1$ of the transmitted message block. Each succeeding shift of the register will shift the span of bits over which the burst is detected by one bit position. The shifting operation can be done $n$-$b$ times where $n$ is the total length of a message block.

Referring still to FIG. 5, the correction logic 250 is shown. During the time that the incoming message is being used in the decoder 239 to calculate a check word, the message is being stored in the buffer storage unit 252. After the last bit of the message has come into the system, the check word will be contained in stages S1 through S8 of the shift register in the decoder 239 and the entire received message will be contained in the buffer storage unit 252. The buffer storage unit 252 may be a shift register, delay line, core memory, magnetic tape or other suitable storage medium.

If a correctable burst has occurred in the first three bits transmitted, then stages S1 through S5 of the shift register will all contain 0's and stages S6 through S8 (the highest order $b$ stages) of the shift register will contain the error pattern. In order to determine whether stages S1 through S5 of the shift register contain 0's, the AND circuit 254 is provided. AND circuit 254 has five inputs, each of the inputs being connected to the output of one of the stages S1 through S5 of the shift register. When all of the stages S1 through S5 of the shift register contain 0's, a signal will appear on the output line 256 of the AND circuit 254. The output 256 of the AND circuit 254 feeds one input of a three-input AND circuit 258. Another input of AND circuit 258 is fed by the output of stage S8 of the shift register contained in the decoder 239. The third output of AND circuit 258 is connected to gate line 260. The output of AND circuit 258 is connected to one input of Exclusive-OR circuit 262. The other input to Exclusive-OR circuit 262 is connected to the output of the buffer storage unit 252. The output of Exclusive-OR circuit 262 is connected directly to the output line 264 of the system.

Once a burst has been located, it will become necessary to shift the contents of the shift register of the decoder 239 without feedback. In order to accomplish this, an AND circuit 266 may be provided following the last stage 8 of the shift register. One input of the AND circuit 266 is connected to the output of stage 8 of the shift register. The other input of AND circuit 266 is connected to the output of inverter circuit 268 the input of which is fed by the output of AND circuit 258.

During the computation of the check word, there will be no signal present on gate line 260 and therefore there will be no output from AND circuit 258. Since this will cause the output of inverter circuit 268 to be positive, the AND circuit 266 will permit proper feedback to be supplied to the shift register in the decoder 239. After the check word has been computed, a signal will appear on gate line 260. Then, if 0's appear in all of the stages S1 through S5 of the shift register (indicating that a correctable burst has been located) there will be an output from AND circuit 258 whenever a 1 appears in the eighth stage of the shift register. This output will disable the AND gate 266 and prevent feedback to the shift register. It will be understood by those skilled in the art that this arrangement is merely one example of many that could be used to block feedback to the shift register when a correctable error has been located.

The decoder 239 and correction logic 250 shown in FIG. 5 detects and corrects errors by performing the following steps:

(1) The entire received message is read into the buffer storage 252 and simultaneously into the shift register of the decoder 239. The shift register of the decoder 239 is shifted with feedback each time that a bit enters the system. There is no feedback in the buffer storage unit 252. During this time, there is no signal on gate line 260.

(2) The received message is then read out of the buffer one bit at a time, and the shift register in the decoder 239 is shifted with feedback once for each bit, with no input. During this step (and during the next step) there is a signal on gate line 260.

(3) As soon as all 0's appear in the first five stages of the shift register, the error pattern will be in the last three high order stages of the shift register, and the erroneous bits will be about to come out of the buffer storage unit 252. Since there are signals appearing on lines 256 and 260, there will be a signal output from AND circuit 258 each time that a 1 appears in the eighth stage of the shift register. Thus, the Exclusive-OR circuit 262 will cause erroneous bits coming from the buffer storage unit 252 to be complemented before they are transmitted to the output line 264.

In order to present an example of how errors are corrected, let us assume that the fourth and sixth bits in the received message were erroneous. In this case, the received message will be 1001110101110110. After the check word has been computed, stages S1 through S8 of the shift register in the decoder 239 will contain the digits 00101000 respectively. Since the first five stages of the shift register do not all contain zeros, no signal will appear on the output 256 of the AND circuit 254. The contents of the buffer storage and of the shift register will then be shifted (with proper feedback in the shift register) and the first bit received (1) will be sent from the buffer storage 252 to the output line 264. After this first shift, stages S1 through S8 of the shift register will contain the digits 00010100 respectively. Since the first five stages of the shift register still will not all contain 0's, on the next shift the second bit received (0) will be shifted from the buffer storage 252 to the output line 264. After this second shift, the eight stages of the shift register will contain the digits 00001010 respectively. After the second shift, there still will not be all 0's in the first five stages of the shift register. Therefore, on the third shift the third digit received (0) will be shifted from the buffer storage unit to the output line. After the third shift, the eight stages of the shift register will contain the digits 00000101 respectively. After the third shift, stages S1 through S5 of the shift register will all contain 0's, and a signal will therefore appear on line 256. Thus, on the fourth shift, the 1 which is in the eighth stage of the shift register will be added (modulo two) by the Exclusive-OR circuit 262 to the 1 which comes from the buffer storage unit 252 to produce a 0 on the output line 264. Thus, the error which caused the fourth bit received to be a 1 is corrected. During the correction process, the output from AND circuit 258 disabled the AND circuit 266 to prevent feedback within the shift register. Thus, after the fourth shift, stages S1 through S8 of the shift register will contain the digits 00000010 respectively. On the fifth shift, the correctly received fifth digit (1) will be shifted from the buffer storage unit to the output line. This digit will not be affected by the 0 which appears in the eighth stage of the shift register. After the fifth shift, stages S1 through S8 of the shift register will contain the digits 00000001 respectively. Thus, on the sixth shift, the 1 which comes from the buffer storage unit 252 will be added modulo-two to the 1 appearing in the eighth stage of the shift register to produce a 0 on the output line. After the sixth shift, both of the errors introduced during transmission will have been corrected, and all stages of the shift register will contain 0's. Thus, on all succeeding shifts, digits will go unchanged from the buffer storage unit 252 to the output line 264.

If, after *n-b* shifts (where *n* is the block length of the message and *b* is the length of a correctable burst) the condition of all 0's in the first five stages of the shift register is not met, this will be an indication that an uncorrectable error has occurred.

The system of FIG. 5 is also capable of detecting burst errors that occur in the redundancy (error detection and correction) bits. For example, if the received message had erroneous bits in the thirteenth and fifteenth bit positions (that is, the received message was

1000100101111100)

this error also could be corrected. After the check word had been calculated, stages S1 through S8 of the shift register would contain the digits 11001111 respectively. Then, after each successive shift, the shift register would contain the digits shown in the following table. The first entry in the table shows the check word. Each successive entry shows the contents of the eight stages of the shift register after a shift.

| | 1 | 2 | 3 | 4 | 5 | 6 | 7 | 8 |
|---|---|---|---|---|---|---|---|---|
| Check word | 1 | 1 | 0 | 0 | 1 | 1 | 1 | 1 |
| First shift | 1 | 0 | 0 | 0 | 1 | 1 | 0 | 1 |
| Second shift | 1 | 0 | 1 | 0 | 1 | 1 | 0 | 0 |
| Third shift | 0 | 1 | 0 | 1 | 0 | 1 | 1 | 0 |
| Fourth shift | 0 | 0 | 1 | 0 | 1 | 0 | 1 | 1 |
| Fifth shift | 1 | 1 | 1 | 1 | 1 | 1 | 1 | 1 |
| Sixth shift | 1 | 0 | 0 | 1 | 0 | 1 | 0 | 1 |
| Seventh shift | 1 | 0 | 1 | 0 | 0 | 0 | 0 | 0 |
| Eighth shift | 0 | 1 | 0 | 1 | 0 | 0 | 0 | 0 |
| Ninth shift | 0 | 0 | 1 | 0 | 1 | 0 | 0 | 0 |
| Tenth shift | 0 | 0 | 0 | 1 | 0 | 1 | 0 | 0 |
| Eleventh shift | 0 | 0 | 0 | 0 | 1 | 0 | 1 | 0 |
| Twelfth shift | 0 | 0 | 0 | 0 | 0 | 1 | 0 | 1 |

As is shown in the table, after twelve shifts have been completed, the first five stages of the shift register will all contain 0's. Also, after twelve shifts have been completed, the first twelve (correctly received) bits will have been transmitted from the buffer storage unit to the output line. In the same manner as has been described above, the thirteenth and fifteenth (erroneous) bits can be corrected on the thirteenth and fifteenth shifts.

Generally, it will not be necessary to correct errors that occur in the redundant bits. It is only necessary to correct errors occurring in the data bits. However, it is necessary to perform a sufficient number of shifts within the shift register to determine that whatever error occurred was correctable.

Although, in the examples given above, the buffer storage unit 252 was assumed to have sufficient capacity to hold the entire transmitted message, it is not necessary that it do this. If correction of data bits is all that is desired, then the buffer storage unit need only be large enough to hold all of the data bits transmitted. In the case of the examples used above, a buffer storage unit with an eight bit capacity would be sufficient to hold all of the transmitted data bits. In a system wherein the redundant bits are not stored in the buffer storage unit, it would be necessary to disconnect the input of the buffer storage from the input to the system. One way of accomplishing this would be to insert an AND circuit 272 between the input to the buffer storage and the input to the system. The gate line 274, during the time that data bits are entering the system, would permit the bits to be stored in the buffer storage unit. During the time when redundant bits are entering the system, no signal would appear on line 274 and the AND circuit 272 would then block the redundant bits from entering the buffer storage unit 252.

COMBINED ENCODER-DECODER-CORRECTION SYSTEM

Figure 6:
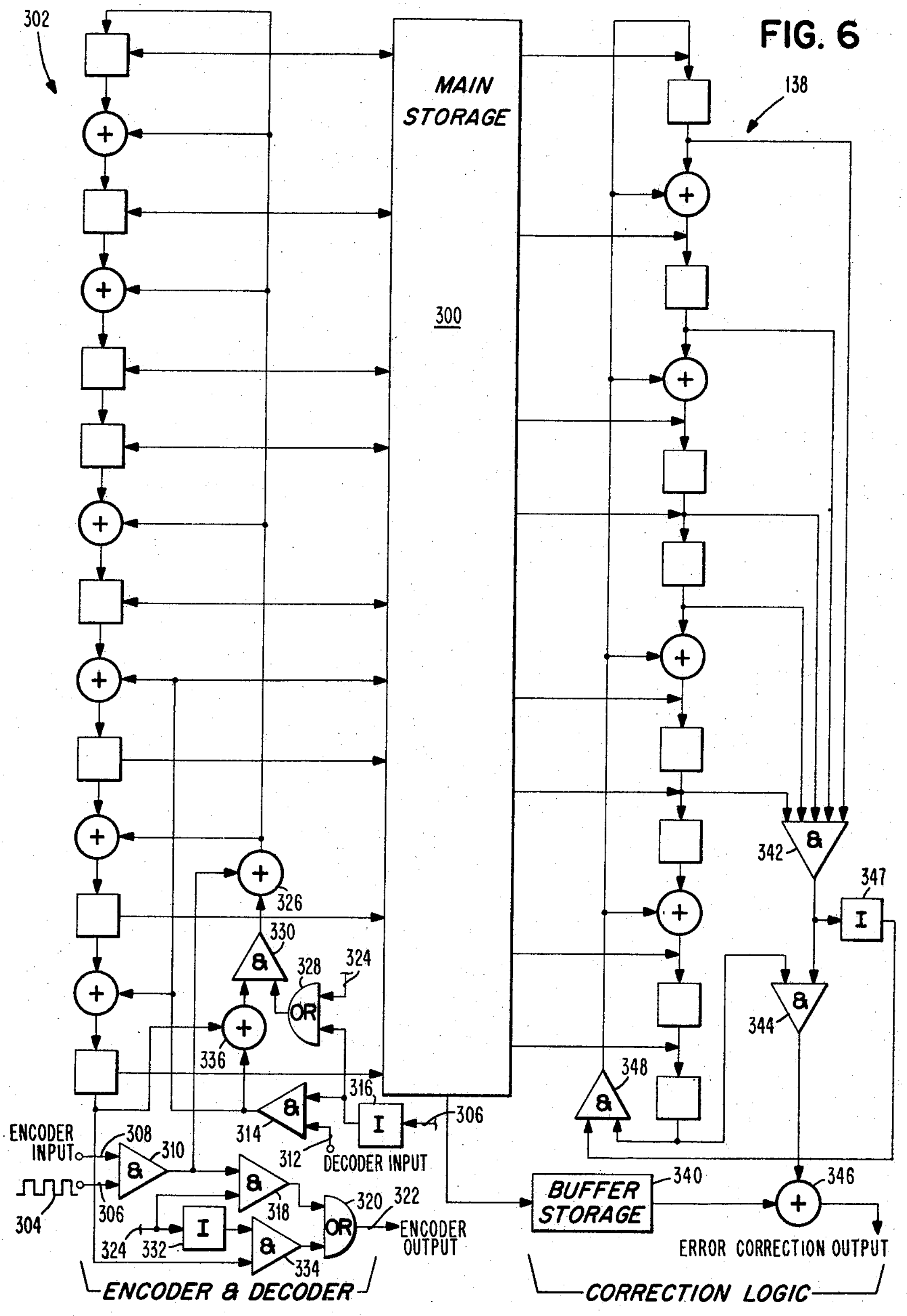
FIG. 6 shows a single apparatus embodying this invention which performs the functions of encoding, decoding and correcting.

Referring to FIGURE 6, details are shown of a combination system for encoding, decoding and correcting messages embodying the above-described simplified version of this invention. The system can encode a message, generate a check word for an encoded message and detect and correct burst errors that have occurred in an encoded message.

The system contains the elements described above in connection with FIGURES 4 and 5 as well as certain additional elements. Most important of the additional elements is the main storage unit 300, the function of which will be described later. The main storage unit 300 may be a core memory, magnetic disc or drum, or other suitable storage medium.

Since a single shift register 302 is used when encoding and when decoding message, it is necessary that a timing control be provided so that a message to be encoded may be kept separate from a message to be decoded. In order to provide the proper timing control, a clocking signal 304 is provided on the line 306. The frequency of the clocking signal 304 is the same as the frequency at which bits may enter the system; that is, during each bit period the signal 304 will rise once and fall once.

A message to be encoded will enter the system on line 308 which is fed to AND circuit 310. The timing line 306 is fed to the other input of AND circuit 310 so that the bits of a message to be encoded will be able to enter the system during the time that the signal 304 is at its high level. Messages to be decoded enter the system on line 312 and are fed to AND circuit 314. Timing line 306 is fed to inverter circuit 316 the output of which feeds the other input of AND circuit 314 so that the bits of a message to be decoded will enter the system during the time that the signal 304 is at its low level.

ENCODING A MESSAGE

When a message to be encoded enters the system over line 308 and goes through the AND circuit 310, the bits of the message are also fed to AND circuit 318 the output of which feeds one input of OR circuit 320 the output of which goes directly to the encoder output line 322. The other input of AND circuit 318 is fed by timing line 324 which will carry a gating signal during the time that a message to be encoded is being received. The bits of the message to be encoded are also fed to modulo-two adder 326. The gating signal on line 324 is also applied to OR circuit 328 the output of which feeds AND circuit 330 the output of which feeds the second input of modulo-two adder 326. Thus, during the time that a message to be encoded is being received, there will be feedback from the highest order stage of the shift register 302 through AND circuit 330 to the modula-two adder 326 (where the contents of the highest order stage of the shift register will be added modulo-two to an incoming data bit) and thence to appropriate stages of the shift register 302 in the manner previously described in connection with FIG. 4. After all of the bits of a message to be encoded have been received, the remainder of the polynomial division process will be contained within the stages of shift register 302. At this time, the pulse appearing on line 324 will be turned off to isolate the encoder input 308 from the encoder output 322. Turning off the pulse on line 324 will also disable AND circuit 330 to prevent feedback to the shift register 302 during the time that the remainder (redundancy) bits are being shifted to the encoder output. Since the signal appearing on line 324 is inverted by the inverter 332 before being fed to AND circuit 334, the remainder bits within the shift register 302 may be shifted out through AND circuit 334, through OR circuit 320 to the encoder output 322.

After each shift of the shift register 302 during the encoding process, the contents of shift register 302 will be stored in the main storage unit 300. Before the next shift of shift register 302 in the encoding process, the contents of the shift register will be restored from the main storage unit 300.

DECODING A MESSAGE

As was explained above, the bits of a message to be decoded will enter the system through AND circuit 314 during the times that the clocking signal 304 is at its low value. The bits of the message to be decoded are also sent to the main storage unit 300 where they will be stored until used in the error correction process. The clocking signal appearing on line 306 is fed, after being inverted by the inverter circuit 316, through OR circuit 328 to AND circuit 330 to permit feedback within the shift register 302 during the decoding process. The bits of the message to be decoded are fed to modulo-two adder 336 the other input of which comes from the last stage of the shift register 302. The output of modulo-two adder 336 supplies appropriate feedback to the shift register in the manner already described in connection with FIGURE 5. The bits of the message to be decoded are also fed directly to certain stages of the shift register to supply feedback as was described in connection with FIGURE 5.

Again, after each shift of the shift register in the decoding process, the contents of the shift register will be transferred to the main storage unit 300 from which they will be restored to the shift register immediately preceding the next shift in the decoding process. After all of the bits of the message to be decoded have been received, the shift register will contain the check word to be used later in the error correction process. The check word will be stored in the main storage unit 300 to be used later as will be described below.

Thus, by shuttling its contents to and from the main storage unit 300 after and before each shift, the single shift register 302 is used both to encode and to decode messages.

ERROR DETECTION AND CORRECTION

As a result of the decoding process described above, a check word to be used in the error correction process will have been stored in the main storage unit 300. The check word will then be taken from the main storage unit and transferred to the shift register 338 contained within the correction logic of the special purpose computer. At the same time, the message which was also stored in the main storage 300 as it was being decoded will be transferred to the buffer storage unit 340 within the correction logic. As was noted above when describing FIGURE 5, only the portion of the message containing data bits need be transferred to the buffer storage unit 340, but the entire message (comprising data bits and redundancy bits) may be transferred thereto if desired.

Detection and correction of burst errors is accomplished in the same maner as in the system shown in FIGURE 5. The AND circuit 342 monitors the $r-b$ (where $r$ is the degree of the coding polynomial and $b$ is the length of a correctable burst) lowest order stages of the shift register to find if they all contain 0's. All 0's in the lowest order $r-b$ stages of the shift register is an indication that the error pattern is contained in the highest order $b$ stages of the shift register. The contents of the buffer storage unit 340 (which contains no feedback) and the shift register 338 (which contains feedback as has been described above) are shifted simultaneously. The output of AND circuit 342 and the output of the highest order stage of the shift register 338 both feed AND circuit 344 which will therefore produce an output when an indication of an erroneous bit is shifted out from the highest order stage of shift register 338. The error indication will be fed to modulo-two adder 346 to complement the erroneous bit that comes from the buffer storage unit 340. Since it is necessary to prevent feedback within the shift register 338 after a correctable burst error has been located, the output of AND circuit 342 is inverted by inverter circuit 347 the output of which is fed to one input of an AND circuit 348 that is within the feedback loop of the shift register 338. This will prevent feedback within shift register 338 after a correctable burst has been located.

As is clear from the above description, the combined system shown in FIGURE 6 operates upon three messages at a time; it encodes one message, it decodes (generates a check word for) another message and it detects and corrects errors in a third message.

For a more complete description of the manner in which the beginning of a message may be detected, reference is made to my copending application Ser. No. 326,879 for "Simultaneous Message Framing and Error Detection" filed Nov. 29, 1963 and assigned to the same assignee as this application. All of the techniques for message framing disclosed therein may be used with this invention and will therefore not be further described herein.

It will be recognized by those skilled in the art that the invention described and claimed in my copending application Ser. No. 599,467 for "Encoding Transmission System" filed Dec. 6, 1966 and assigned to the same assignee as this application may also be used to advantage in conjunction with the present invention. In accordance with this invention, redundancy bits calculated from one block of data are interleaved between the data bits of the next succeeding block of data when they are transmitted. The manner in which this is accomplished in described in my reference copending application and need not be further discussed herein.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A burst error correction system comprising:
- a source of data signal;
- encoding means producing at its output said data signal and a redundancy signal;
- a communication link transmitting the output of said encoding means;
- decoding means receiving at its input the transmitted data signal and redundancy signal and producing a check word from said transmitted data signal and redundancy signal; and
- correction means connected to said decoding means including means for determining whether a correctable burst of errors has occurred during transmission, and means for correcting a correctable burst of errors that has occurred;
- said means for determining whether a correctable burst of errors has occurred comprising means for examining only less than one half of the bits in said check word;
- said system correcting substantially all burst errors of a given length.

2. The burst error correction system of claim 1 wherein:
- said data signal and said redundancy signal each comprises a train of positive and negative electrical pulses;

- said redundancy signal comprises the remainder of $$\frac{X^r D(X)}{P(X)}$$

where P(X) is a coding polynomial of degree $r$ and D(X) is a polynomial in X representative of said data signal;
- said decoding means comprised of a shifting means for shifting $r$ signal sequentially, said shifting means having:
  - $r$ stages, each of said $r$ stages associated with an $i_{th}$ power of said coding polynomial P(X) and each of said $r$ stages having parameters $a_i$ and $b_i$ where $a_i$ represents the coefficient of the $i^{th}$ power of X of said coding polynomial P(X) and $b_i$ is found by solving the equation $$\sum_{i=0}^{r-1} b_i X^{n-r+i} = 1$$

modulo P(X), where $n$ equals the number of bits in said data signal plus the number of bits in said redundancy signal,
  - $k$ Exclusive-OR circuits, where $k$ equals the number of $r$ stages having said parameter $a_i$ or $b_i$ equal to 1, and
  - a feedback Exclusive-OR circuit having a first input connected to the input of said encoding means and a second input to the output of the $r^{th}$ stage of said $r$ stages of said shifting means;
  - where the output of the $i_{th}$ stage of said $r$ stages having said parameter $a_i = 0$ and $b_i = 0$ being connected to the input of the $(i+1)^{th}$ stage of said $r$ stages,
  - where the output of the $i^{th}$ stage of said $r$ stages, having said parameter $a_i = 0$ and $b_i = 1$ being connected to a first input of one of said $k$ Exclusive-OR circuits, the second input of said one of said $k$ Exclusive-OR circuits being connected to the input of said decoding means, and the output of said one of said $k$ Exclusive-OR circuits being connected to the input of the $(i+1)_{th}$ stage or said $r$ stages,
  - where the output of the $i^{th}$ stage of said $r$ stages having said parameter $a_i = 1$ and $b_i = 0$ being connected to a first input of ones of said $k$ Exclusive-OR circuits, the second input of said one of said $k$ Exclusive-OR circuits being connected to the output of the $r^{th}$ stage of said $r$ stages; and
  - where the output of the $i^{th}$ stage of said $r$ stages having said parameter $a_i = 1$ and $b_i = 1$, being connected to a first input of one of said $k$ Exclusive-OR circuits, the second input of said one of said $k$ Exclusive-OR circuits being connected to the output of said feedback Exclusive-OR circuit, and the output of said one of said $k$ Exclusive-OR circuit being connected to the input of the $(i+1)^{th}$ stage of said $r$ stages;
  - said means for determining whether a correctable burst of errors has occurred comprises an AND circuit and a number of connecting means, each of said connecting means being connected to the output of one of said stages of said shifting means and to an input to said AND circuit;
  - said number of connecting means being an integer lying within the range bounded by $\log_2 (n+1)$ through $$\frac{r-1}{2}$$

inclusive.

3. The burst error correction system of claim 2 wherin: said number of connecting means is equal to the greatest integer that is equal to or less than $$\frac{r-1}{2}$$

References Cited

UNITED STATES PATENTS

| | | | |
|---|---|---|---|
| 3,373,404 | 3/1968 | Webb | 340—146.1 |
| 3,389,375 | 6/1968 | Burton | 340—146.1 |
| 3,402,390 | 9/1968 | Tsimbidis et al. | 340—146.1 |
| 3,411,135 | 11/1968 | Watts | 340—146.1 |

MALCOLM A. MORRISON, Primary Examiner

C. E. ATKINSON, Assistant Examiner

U.S. Cl. X.R.

325—41